United States Patent [19]

Myers

[11] Patent Number: 4,853,905
[45] Date of Patent: Aug. 1, 1989

[54] SEAL FOR MARINE SEISMIC SOURCE

[75] Inventor: Wilbur J. Myers, Davis, Okla.

[73] Assignee: Conoco Inc., Ponca City, Okla.

[21] Appl. No.: 152,513

[22] Filed: Feb. 5, 1988

[51] Int. Cl.⁴ .......................................... H04R 23/00
[52] U.S. Cl. .................................. 367/143; 367/172;
367/174; 181/120
[58] Field of Search ............... 367/141, 157, 163, 165,
367/166, 171, 172, 173, 174, 142, 143; 181/110,
120; 310/337

[56]  References Cited

U.S. PATENT DOCUMENTS

| | | | |
|---|---|---|---|
| 2,921,477 | 1/1960 | Hanggi | 74/87 |
| 3,390,737 | 7/1968 | Johnson | 181/0.5 |
| 3,392,369 | 7/1968 | Dickie et al. | 181/120 |
| 3,449,712 | 6/1969 | Angeloff | 367/155 |
| 3,676,840 | 7/1972 | Bays | 340/12 |
| 3,781,779 | 12/1973 | Tallman | 340/8 R |
| 3,792,425 | 2/1974 | Magneville et al. | 340/12 R |
| 4,153,134 | 5/1979 | Yang | 181/120 |
| 4,252,210 | 2/1981 | Sodich | 181/119 |
| 4,383,591 | 5/1983 | Ogura | 181/106 |

*Primary Examiner*—Deborah L. Kyle
*Assistant Examiner*—J. Woodrow Eldred

[57] ABSTRACT

A marine seismic vibrator includes a housing having first and second housing portions defining an internal chamber therebetween. A hydraulic cylinder or other energizing device is connected between the first and second housing portions. The first and second housing portions are maintained in a spaced apart, non-contacting relationship. Relative motion between the first and second housing portions is provided by the hydraulic cylinder in order to generate acoustic waves in a surrounding body of water. An annular flexible seal construction is connected between the first and second housing portions for isolating the internal chamber from the surrounding body of water. This seal construction includes first and second flexible web portions sealingly connected to the first and second housing portions. A rigid hoop is connected between the first and second web portions for supporting the seal against pressure differentials between the internal chamber and the surrounding body of water. This hoop preferably has an axial length substantially greater than a radial thickness thereof. The first web portion of the seal extends from the first housing portion toward the second housing portion, then radially toward the rigid hoop, then away from the second housing portion, then again toward the rigid hoop, thus defining a serpentine cross section to accommodate relative motion between the first and second housing portions by bending deformation of said serpentine cross section.

17 Claims, 2 Drawing Sheets

SEAL FOR MARINE SEISMIC SOURCE

BACKGROUND OF THE INVENTION

1. Field Of The Invention

The present invention relates generally to marine seismic vibrators, and more particularly, but not by way of limitation, to a seal construction for use in such a vibrator.

2. Description Of The Prior Art

During marine seismic exploration, a vibrator is typically lowered into the water and towed from an operating vessel, to generate acoustic signals which are transmitted through the water and into the underlying subsurface geological formations. Acoustic signals reflected from those formations are measured by various sensing devices.

One typical type of marine seismic vibrator which has been used comprises first and second relatively movable dome-shaped body or housing members operably connected by a hydraulic cylinder and piston assembly in a manner generally like that shown in U.S. Pat. No. 3,676,840 to Bays.

With such a marine seismic vibrator, a flexible seal must be provided between the first and second dome-shaped housing portions to allow relative motion therebetween, while isolating the internal chamber of the vibrator from the surrounding water.

An early design for such a seal, which has previously been used, and is a part of the prior art, is shown in FIG. 5 of the present disclosure. The prior art seal of FIG. 5 has a generally semi-circular cross section open toward the internal chamber of the vibrator. The pressure inside the vibrator housing acts directly against the seal. The seal is held in place by integral lugs on the seal which fit in notches on the upper and lower housing portions. The seal is held in contact with the vibrator housing by annular retaining bands which fit around the circumference of each of the dome-shaped housing portions. The design of FIG. 5 has disadvantages due to its inability to withstand inward pressure differentials that are sometimes encountered.

Another prior art seal design is that shown in U.S. Pat. No. 3,676,840 to Bays, which utilizes a toroidal seal having a closed cross section similar to that of a tire inner tube. In practice, air pressure inside the toroidal seal of the Bays patent and also inside the vibrator housing is maintained at approximately the same pressure as the hydrostatic water pressure outside the vibrator. Although this design functions very well, tooling and production parts to manufacture the toroidal seal having a closed cross section are relatively expensive to manufacture.

SUMMARY OF THE INVENTION

The present invention provides a marine seismic vibrator having an improved seal construction which provides advantages over either of the prior art devices discussed above. The seal construction of the present invention has an open cross section making it much more economical to manufacture than that of the Bays patent, while at the same time including a rigid hoop means embedded in the seal which supports the seal against pressure differentials between the internal chamber and the surrounding body of water.

The marine seismic vibrator of the present invention has a housing including first and second housing portions defining an internal chamber therebetween.

An energizing means, such as a hydraulic cylinder, is connected between the first and second housing portions for maintaining the housing portions in a spaced apart noncontacting relationship and for moving the first and second housing portions relative to each other to generate acoustic waves in the surrounding body of water.

An annular flexible seal means is connected between the first and second housing portions for isolating the internal chamber from the body of water. The seal means includes first and second flexible web portions sealingly connected to the first and second housing portions, respectively.

The seal means further includes a rigid hoop means connected between the first and second web portions for supporting the seal means against pressure differentials between the internal chamber and the surrounding body of water. This hoop means preferably has an axial length substantially greater than a radial thickness thereof.

The first web portion preferably extends from the first housing portion toward the second housing portion, then radially toward the rigid hoop means, then away from the second housing portion, then toward the hoop means, thus defining a serpentine cross section to accommodate relative movement between the first and second housing portions by bending deformation of said serpentine cross section.

The second web portion is preferably a mirror image of the first web portion about a plane lying between the first and second housing portions.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
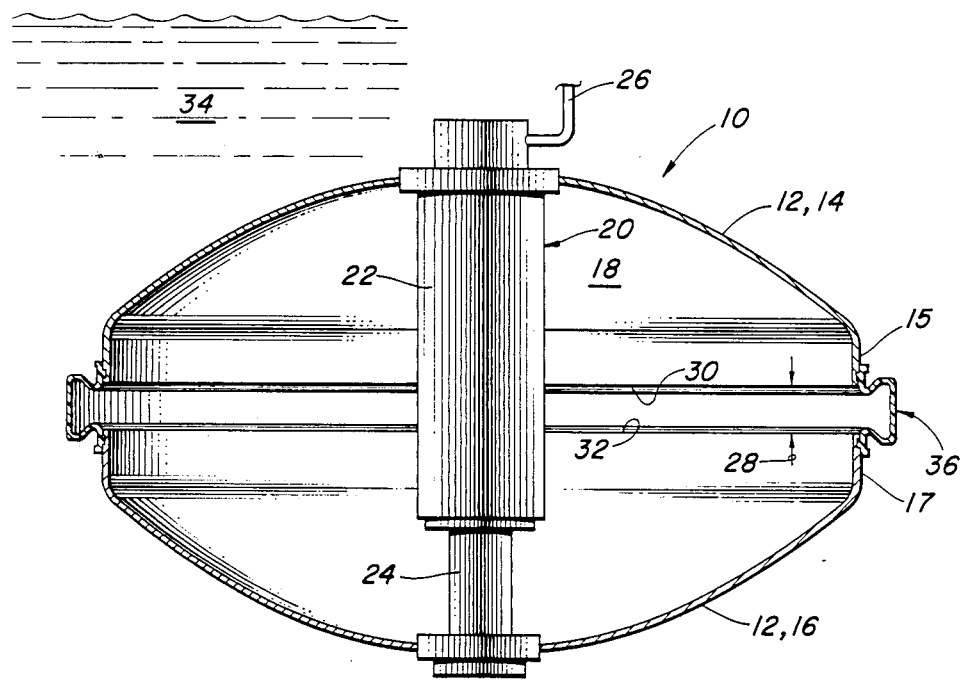
FIG. 1 is an elevation section, somewhat schematic illustration of a marine seismic vibrator incorporating the seal construction of the present invention.

In FIG. 1, the marine seismic vibrator of the present invention is shown and generally illustrated by the numeral 10. The vibrator 10 may also be referred to as an acoustic energy source 10.

The vibrator 10 includes a housing 12 having first and second dome-shaped housing portions 14 and 16, respectively. A lower skirt portion 15 of first housing portion 14 is generally cylindrical in shape. Similarly, an upper skirt portion 17 of second housing portion 16 is generally cylindrical in shape.

The housing 12 may be generally referred to as a body 12, and the housing portions 14 and 16 may be generally referred to as first and second body portions or body members 14 and 16.

An internal chamber 18 is defined between the first and second housing portions 14 and 16. A hydraulic cylinder 20 is connected between the first and second housing portions 14.

The hydraulic cylinder 20 may generally be referred to as an energizing means 20 or actuating means 20.

The hydraulic cylinder 20 has a cylinder portion 22 with a piston 24 extending therefrom, with relative motion therebetween being controlled by hydraulic signals transmitted from a surface location through a hydraulic control line schematically illustrated as 26.

The hydraulic cylinder 20, as best seen in FIG. 1, maintains the first and second housing portion 14 and 16 in a spaced apart, non-contacting relationship so that there is a vertical gap 28 between a lower edge 30 of first housing portion 14 and an upper edge 32 of second housing portion 16.

The hydraulic cylinder 20 also provides a means for moving the first and second housing portions 14 and 16 relative to each other to generate acoustic waves in a surrounding body of water 34. The body of water 34 may also be generally referred to as a fluid medium.

An annular flexible seal means 36 is connected between the first and second housing portions 14 and 16 for isolating the internal chamber 18 from the surrounding body of water 34. The seal means 36 may also be described as a seal construction for sealing between the first and second relatively movable housing portions 14 and 16.

Figure 2:
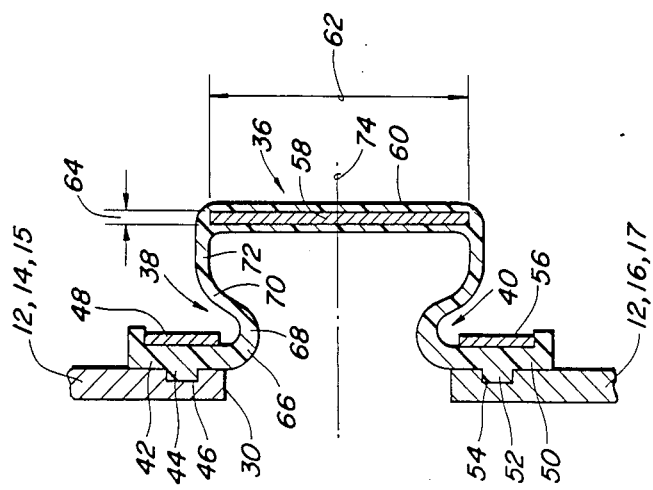
FIG. 2 is an enlarged elevation sectioned view of the seal construction of the marine seismic vibrator of FIG. 1.

The seal means 36 is best illustrated in the enlarged view of FIG. 2 which shows the housing portions 14 and 16 in a "neutral" position. The seal means 36 includes first and second flexible web portions or seal portions 38 and 40, respectively, which are sealingly connected to the first and second housing portions 14 and 16, respectively. For example, the first web portion 38 includes an annular seal skirt 42 having an annular lug 44 integrally defined thereon which is received in an annular groove 46 defined in the skirt 15 of first housing portion 14. The seal skirt 42 is held in contact with the first housing portion skirt 15 by an annular retaining band 48 which is tightened around the seal skirt 42.

The second web portion 40 is similarly constructed having a seal skirt 50, annular lug 52 received in annular groove 54, and an annular retaining band 56.

The seal means 36 includes a rigid hoop means 58 connected between the first and second web portions 38 and 40, for supporting the seal means 36 against pressure differentials between the internal chamber 18 and the surrounding body of water 34. The hoop means 58 may also be referred to as a rigid stiffener means 58.

The seal means 36 further includes an intermediate portion 60 defined between and integrally formed with the first and second web portions 38 and 40 from a flexible material. The first and second web portions 38 and 40 and the intermediate portion 60 of seal means 36 may be formed from any suitable flexible material, such as for example an elastomeric material such as rubber.

As best seen in FIG. 2, the rigid hoop means 58 is preferably completely embedded in the intermediate portion 60 of seal means 36.

The hoop means 58, in the preferred embodiment shown in FIG. 2, is an annular band having an axial length 62 substantially greater than a radial thickness 64 thereof. The radial thickness 64 may also be generally referred to as a lateral thickness 64.

The hoop means 58 is a relatively rigid member which should have a cross-sectional shape, and material of construction, sufficient to give strength to resist the maximum inwardly directed and outwardly directed operating pressure differentials which are expected to be encountered in operation of the vibrator 10. Typical materials which may be useful for construction of the hoop means 58 would be steel, aluminum, magnesium, and reinforced plastics, as well as other materials. The hoop means 58 should generally be constructed from a lightweight material with a relatively high strength and bending modulus. As can be seen in FIG. 2, the hoop means 58 is actually suspended by the web portions 38 and 40. It is, therefore, important to minimize the weight of the hoop means 58 and surrounding seal material in order to minimize dynamic reactions thereof resulting from vibration of the vibrator 10.

When the internal pressure within internal chamber 18 exceeds the pressure of the surrounding body of water 34 by the maximum anticipated amount, the seal means 36 is said to be subjected to a maximum outwardly directed operating pressure differential. This would impose the maximum hoop tension loading on hoop means 58. When the pressure of the surrounding body of water 34 exceeds the pressure within internal chamber 18 by a maximum anticipated amount, the seal means 36 is said to be subjected to a maximum inwardly directed operating pressure differential. The hoop means 58 must be constructed to support that maximum inwardly directed pressure differential in hoop compression without buckling of the hoop means 58.

As best seen in FIG. 2, in the preferred embodiment, the hoop means 58 is located radially outward from the first and second web portions 38 and 40 of seal means 36. It is noted that the hoop means 58 could also be located radially inward of the web portions 38 and 40, i.e., within the housing 12.

The first web portion 38 has a serpentine cross-sectional shape. The first web portion 38 extends freely as at 66 beyond the axially innermost end or lower edge 30 of first housing portion 14 axially toward the second housing portion 16, then radially toward the hoop means 58 as at 68, then generally axially away from second housing portion 16 as at 70, then toward hoop means 58 as at 72, thus defining the said serpentine cross section. This serpentine cross section accommodates relative movement between the first and second housing portions 14 and 16 by bending deformation of the serpentine cross section.

The second web portion 40 is substantially a mirror image of first web portion 38 about a plane 74 lying between the first and second housing portions 14 and 16.

The flexible web portions 38 and 40 of seal means 36 will have minor loadings because of their relatively short length and because they cannot be loaded in direct tension. The major portion of any loading created by a pressure differential between the internal chamber 18 and the surrounding body of water 34 is carried by the hoop means 58.

Figure 4:
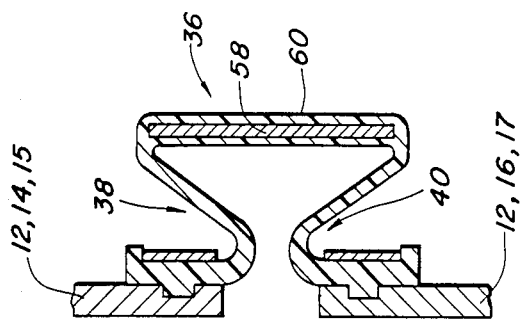
FIG. 4 is an enlarged elevation section view of the seal construction of FIGS. 2 and 3, showing the vibrator housing in its most retracted position.
Figure 3:
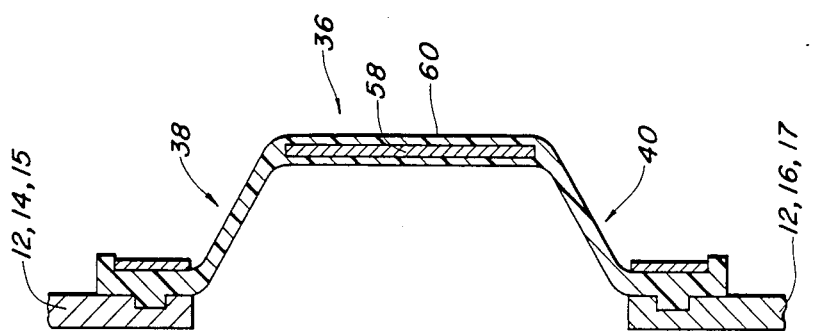
FIG. 3 is an enlarged elevation section view of the seal construction of FIG. 2, showing the vibrator housing in its most extended position.

FIGS. 3 and 4 are similar to FIG. 2, and show the extreme extended and retracted relative positions, respectively, of the housing portions 14 and 16. As is apparent in FIGS. 3 and 4, this relative motion between the housing portions 14 and 16 is accommodated substantially entirely by bending deformation of the web portions 38 and 40 without any substantial stretching thereof.

It should be noted that the flexible web portions 38 and 40 of the seal means 36 are not in tension in either of the extreme positions of FIGS. 3 and 4, except for a relatively small force which would result from a difference in pressure between the internal chamber 18 and the external body of water 34.

The seal construction of the present invention, as shown in FIGS. 1-4, has a number of advantages over prior art constructions.

As previously mentioned, the open cross-sectional shape of the seal means 36 of FIG. 2 is much less expensive to manufacture than the closed cross-section of the toroidal seal of U.S. Pat. No. 3,676,840 to Bays.

Also, the present invention has an advantage as compared to the seal of the Bays patent in that the seal of the Bays patent with the closed cross section is rather inefficient with regard to the energy required to operate the vibrator. When moving a vibrator having a seal like that of the Bays patent to its extreme positions, the closed cross section tends to be stretched or compressed into a somewhat oval shape thus tending to reduce its cross-sectional area and compress the pressurized gas contained therein. This takes considerable energy and is much less energy efficient than a vibrator having an open seal like that of the present invention.

Figure 5:
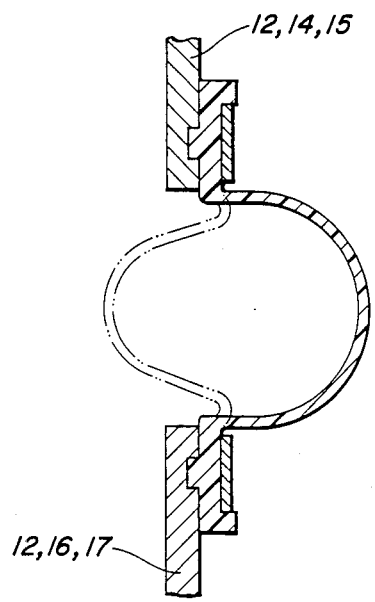
FIG. 5 is an elevation cross-section view of a prior art seal construction.

Furthermore, the seal construction of FIG. 2 has a number of operational advantages over the prior art construction illustrated in FIG. 5.

FIG. 5 shows the prior art seal design in an enlarged cross-sectional view similar to the view of FIG. 2. The seal of FIG. 5 can be utilized with a housing 12 like that illustrated in FIG. 1.

The prior art seal of FIG. 5 has a substantially semi-circular cross section open toward the internal chamber 18 of the housing 12. The pressure inside the chamber 18 is the same pressure acting against the seal of FIG. 5. The seal of FIG. 5 is held in place upon the housing portions 14 and 16 in a manner similar to that for the seal means 36 described with regard to FIG. 2.

The difficulties with the prior art seal design of FIG. 5 is that it often deteriorates when subjected to pressure differentials between the internal chamber 18 and the surrounding body of water 34, particularly inwardly directed pressure differentials. For long strokes of the hydraulic cylinder 20, large air pressure variations may occur within the internal chamber 18. At the lower pressure end of the cycle corresponding to maximum extension of the hydraulic cylinder 20, the seal of FIG. 5 can actually reverse to a position like that shown in phantom lines in FIG. 3 and subsequently be damaged as the hydraulic cylinder 20 is retracted. This phenomenon can also occur if the nominal pressure within the internal chamber 18 of housing 12 is too low with respect to the hydrostatic water pressure of the surrounding body of water 34.

The seal construction 36 of FIG. 2 of the present invention eliminates these problems by providing the rigid hoop means 58 for supporting the seal means 36 against pressure differentials between the internal chamber 18 and the surrounding body of water 34. The seal construction 36 of the present invention is particularly improved in that it will not collapse inwardly like the prior art seal of FIG. 5 when subjected to a maximum inwardly directed operating pressure differential.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A marine seismic vibrator, comprising:
  a housing including first and second housing portions defining an internal chamber therebetween;
  energizing means, connected between said first and second housing portions, for maintaining said first and second housing portions in a spaced apart, non-contacting relationship and for moving said first and second housing portions relative to each other to generate acoustic waves in a body of water surrounding said vibrator; and
  annular flexible seal means, connected between said first and second housing portions, for isolating said internal chamber from said body of water, said seal means including:
    first and second flexible web portions sealingly connected to said first and second housing portions, respectively; and
    rigid hoop means for supporting said sealed means against pressure differential between said internal chamber and said body of water; and
    an intermediate portion defined between and integrally formed with said first and second web portions from a flexible material, said hoop means being completely embedded in said intermediate portion of said seal means.

2. The marine seismic vibrator of claim 1, wherein:
  said hoop means is an annular band having an axial length substantially greater than a radial thickness thereof.

3. The marine seismic vibrator of claim 2, wherein:
  said hoop means has sufficient strength to resist buckling when subjected to a maximum inwardly directed operating pressure differential.

4. The marine seismic vibrator of claim 1, wherein:
  said hoop means is located radially outward from said first and second web portions.

5. The marine seismic vibrator of claim 1, wherein:
  said seal means is further characterized in that said first web portion extends freely beyond an axially innermost end of said first housing portion axially toward said second housing portion, then radially toward said hoop means, then axially away from said second housing portion, then toward said hoop means, thus defining a serpentine cross section to accommodate relative movement between said first and second housing portions by bending deformation of said serpentine cross section.

6. The marine seismic vibrator of claim 5, wherein:
  said hoop means is located radially outward from said first and second web portions.

7. An acoustic energy source, comprising:
  a body including first and second body portions defining an internal chamber therebetween;
  actuating means operably associated with said first and second body portions, for inducing relative motion between said first and second body portions to generate acoustic waves in a fluid medium surrounding said body; and flexible seal means connected between said first and second body portions for isolating said internal chamber from said fluid medium, said seal means including:
  first and second flexible seal portions sealingly connected to said first and second body portions, respectively; and
  an intermediate seal portion connected between said first and second flexible seal portions, said intermediate seal portions including rigid hoop means embedded within for supporting said seal means against pressure differentials between said internal chamber and said fluid medium, said hoop means having an axial length substantially greater than a radial thickness thereof.

8. The acoustic energy source of claim 7, wherein:
said hoop means has sufficient strength to resist buckling when subjected to a maximum inwardly directed operating pressure differential.

9. The acoustic energy source of claim 7, wherein:
said hoop means is located radially outward from said first and second flexible seal portions.

10. The acoustic energy source of claim 7, wherein:
said seal means is further characterized in that said first flexible seal portion extends from said first body portion toward said second body portion, then radially toward said hoop means, then away from said second body portion, then toward said hoop means, thus defining a serpentine cross section to accommodate relative movement between said first and second body portions by bending deformation of said serpentine cross section.

11. The acoustic energy source of claim 10, wherein:
said hoop means is located radially outward from said first flexible seal portion.

12. The acoustic energy source of claim 10, wherein:
said second flexible seal portion is a substantially mirror image of said first flexible seal portion.

13. A seal construction for sealing between first and second relatively movable body members, comprising:
  first and second flexible web portions adapted to be sealingly connected to said first and second body members, respectively:
  an intermediate portion defined between and integrally formed with said first and second web portion from a flexible material;
  rigid stiffener means embedded within said intermediate portion for supporting said seal construction against a pressure differential across said seal construction; and
  wherein said first web portion extends from said first body member toward said second body member, then laterally toward said stiffener means, then away from said second body member, then toward said stiffener means, thus defining a serpentine cross section to accommodate relative movement between said first and second body members by bending deformation of said serpentine cross section.

14. The seal construction of claim 13, wherein:
said second web portion is substantially a mirror image of said first web portion about a plane lying between said first and second body members.

15. The seal construction of claim 13, wherein:
said seal construction is generally annular in shape; and
said stiffener means is a rigid hoop capable of supporting a maximum radially inward operating pressure differential in hoop compression without buckling.

16. The seal construction of claim 15, wherein:
said rigid hoop is located radially outward from said first and second web portions.

17. The seal construction of claim 13, wherein:
said rigid stiffener means has an axial length substantially greater than a lateral thickness thereof.

* * * * *